United States Patent
Abraham et al.

(10) Patent No.: US 10,704,606 B2
(45) Date of Patent: Jul. 7, 2020

(54) TORQUE DISC

(71) Applicant: Crompton Technology Group Limited, West Midlands (GB)

(72) Inventors: David Abraham, Weston on Trent (GB); Aniel Ganatra, Birmingham (GB)

(73) Assignee: CROMPTON TECHNOLOGY GROUP LIMITED, Shirley, Solihull (GB)

( * ) Notice: Subject to any disclaimer, the term of this patent is extended or adjusted under 35 U.S.C. 154(b) by 228 days.

(21) Appl. No.: 15/581,107

(22) Filed: Apr. 28, 2017

(65) Prior Publication Data

US 2017/0328417 A1 Nov. 16, 2017

(30) Foreign Application Priority Data

Apr. 29, 2016 (EP) .................................... 16167826

(51) Int. Cl.
| | |
|---|---|
| *F16D 3/56* | (2006.01) |
| *F16D 3/78* | (2006.01) |
| *F16B 39/10* | (2006.01) |
| *F16B 4/00* | (2006.01) |

(52) U.S. Cl.
CPC ............... *F16D 3/56* (2013.01); *F16B 39/10* (2013.01); *F16D 3/78* (2013.01); *F16B 4/004* (2013.01); *F16D 2300/12* (2013.01)

(58) Field of Classification Search
CPC .......... F16D 3/56; F16D 3/78; F16D 2300/12; F16B 39/10; F16B 4/004
USPC ............................... 464/93–96; 411/257, 321
See application file for complete search history.

(56) References Cited

U.S. PATENT DOCUMENTS

| | | | | |
|---|---|---|---|---|
| 1,055,961 A | * | 3/1913 | Wich | ...................... F16B 39/06 411/321 |
| 1,350,500 A | * | 8/1920 | Hardy | ........................ F16D 3/78 464/93 |
| 1,359,157 A | | 11/1920 | Dexter | |
| 1,362,633 A | | 12/1920 | McCutcheon | |
| 8,608,420 B2 | | 12/2013 | Kovac et al. | |
| 10,138,945 B2 | * | 11/2018 | Chase | ........................ F16D 3/78 |
| 2014/0309042 A1 | * | 10/2014 | Chase | ........................ F16D 3/78 464/92 |
| 2015/0322994 A1 | | 11/2015 | Mangapora et al. | |

FOREIGN PATENT DOCUMENTS

| | | |
|---|---|---|
| EP | 2995830 A1 | 3/2016 |
| JP | 2000240633 A | 9/2000 |
| WO | 2013064807 A1 | 5/2013 |
| WO | 2015107321 A1 | 7/2015 |

OTHER PUBLICATIONS

Extended European Search Report for International Application No. 16167826.3 dated Oct. 24, 2016, 7 pages.

* cited by examiner

*Primary Examiner* — Greg Binda
(74) *Attorney, Agent, or Firm* — Cantor Colburn LLP

(57) ABSTRACT

A torque disc comprising a fixing surface and at least one restraining element. The fixing surface defines an area of the torque disc for attachment to a fastener in use, and the at least one restraining element extends from the fixing surface so as to engage in use with at least one portion of the fastener to restrain rotational movement of the fastener during attachment to or detachment from the torque disc.

11 Claims, 6 Drawing Sheets

TORQUE DISC

FOREIGN PRIORITY

This application claims priority to European Patent Application No. 16167826.3 filed Apr. 29, 2016, the entire contents of which is incorporated herein by reference

TECHNICAL FIELD

The present disclosure relates to a torque disc and a torque disc assembly. More specifically, but not exclusively, the present disclosure relates to a torque disc and a torque disc assembly for connection to one or more components using fasteners.

BACKGROUND

The use of torque discs for joining a pair of generally coaxial components together and transmitting torque from one component to the other is well known. For example, torque discs are used in the transmission of torque between a pair of rotating shafts, or the like, in aircraft wings, trains, and automobiles.

Typically, torque discs are connected to a component by at least one fastener such as, for example, a push-fit assembly, screw-fit assembly, or other form of fastener comprising mating components. For example, a torque disc may be connected to a component by a bolt inserted through an opening in the torque disc and screwed into a nut until a sufficiently tight and rigid connection has been made.

A potential problem with such torque discs is that engineers are typically required to manually restrain the fastener at a fixing point to prevent it from moving (e.g. rotating) while the fastener is secured onto the torque disc or disassembled from the torque disc. Accordingly, in the above example the engineer needs to restrain the nut at the opening so as to prevent the nut from rotating while he simultaneously screws the bolt to tighten the fastener onto the torque disc, or to release the fastener.

This problem is particularly problematic when installing the torque disc inside a machine such as an aircraft wing where the dimensions of the aircraft wing and other components of the wing restrict the space available to the engineer for installing, inspecting or replacing a torque disc assembly. In particular, it is not always possible to restrain the movement of a fastener while it is attached to or removed from the torque disc during, for example, installation or maintenance of the torque disc assembly. In such cases, surrounding assemblies typically need to be disassembled in order to gain working access to the torque disc and its fasteners. Furthermore, even when it is possible to restrain the movement of a fastener without disassembling surrounding components, accidental slippage of a tool (e.g. spanner or a socket) for restraining the fastener may result in the tool damaging fragile components surrounding the torque disc.

Such problems may be exacerbated in automotive and aerospace systems where lightweight composite material torque discs are used for power transmission couplings in environments with limited access. An example of a composite material torque disc is described in PCT patent Application No. PCT/GB2012/052596 filed on 19 Oct. 2012, published as WO2013064807, the entire contents of which is incorporated herein by reference.

The present disclosure seeks to provide an improved torque disc and related torque disc assembly.

SUMMARY

According to a first aspect of the present disclosure there is provided a torque disc comprising: a fixing surface, the fixing surface defining an area of the torque disc for attachment to a fastener in use; and at least one restraining element extending from the fixing surface so as to engage in use with at least one portion of the fastener to restrain rotational movement of the fastener during attachment to or detachment from the torque disc.

The restraining element permits the ease of installation in confined areas and thereby allows for space efficient design of surrounding assemblies and structure.

More particularly, the restraining element makes it easier to attach and detach a fastener to the torque disc by engaging with, for example gripping, at least a portion of a fastener (e.g. a nut portion, bolt portion, an insert portion, or any other suitable portion of a fastener) at the fixing surface so as to restrain rotational movement of the fastener. Advantageously, this restraining force is provided by the restraining element rather than an engineer holding the fastener. Accordingly, when fastening the fastener to the torque disc by, for example, screwing a bolt into the fastener, the engineer does not need to simultaneously hold the fastener to restrain or withstand the rotational movement of the fastener. This is particularly beneficial when installing or removing the torque disc in, for example, airplane wings where space is limited.

Preferably the fixing surface is shaped to define the at least one restraining element. In some examples, the fixing surface is moulded to define one or more restraining elements, for example, during moulding of the torque disc.

In some examples, the restraining element is a protrusion extending from the fixing surface so as to engage in use with at least one portion of the fastener (e.g. a nut portion, bolt portion, an insert portion, or any other suitable portion of a fastener). In other words, the at least one restraining element is a protrusion extending out of the fixing surface. The protrusion may be arranged to engage in use with at least one portion of the fastener by pressing against an outer or inner wall of the fastener. As an example, the protrusion may be arranged to press against one of the six edge facets of a hexagonal shaped nut and, preferably, a further protrusion may be arranged to press against a nonadjacent edge facet of the hexagonal shaped nut.

Additionally or alternatively, the protrusion may be shaped to fit at least partially inside the at least one portion of the fastener so that the protrusion obstructs rotational movement of the fastener during attachment to or detachment from the torque disc. For example, the protrusion may be shaped to fit inside a depression, a recess, or an opening defined in the fastener.

As a further example, the protrusion may be shaped to fit with or against a mating surface of the fastener.

In a preferred example, the protrusion is shaped to interference fit inside the at least one portion of the fastener. For example, the protrusion may be shaped to interference fit inside a depression or opening defined in the fastener.

In some examples, the restraining element is a depression or a recess extending from the fixing surface so as to engage in use with at least one portion of the fastener (e.g. a nut portion, bolt portion, an insert portion, or any other suitable portion of a fastener). In other words, the at least one restraining element is a depression or a recess extending into (rather than out of) the fixing surface. The depression may be shaped to at least partially house the at least one portion of the fastener so as to engage with the at least one portion of the fastener and thereby restrain rotational movement of the fastener during attachment. As an example, the depression may be shaped to wrap around a protrusion extending from the fastener. As a further example, the depression may be shaped to wrap around the perimeter of the fastener. Optionally, the depression may be shaped to house the at least one portion of the fastener such that the at least one portion of the fastener interference fits inside the depression.

The at least one restraining element may have a substantially spherical, hemispherical, ellipsoidal, cylindrical, cuboid, polygonal, or multi-lobular shape. Preferably, the at least one restraining element is hemispherical in shape.

The amount of resistance provided by a restraining element against the rotational movement of the fastener may be increased by increasing the size of restraining element (e.g. increasing the footprint or diameter of the restraining element) so as to increase the effective area over which it engages with the fastener.

The size of the restraining element may be set based on a shear load induced between the restraining element and the fastener during attachment or detachment. Additionally or alternatively, the size of the restraining element may be set based on the shear strength of one or more materials forming the restraining element. Furthermore, the size of the restraining element may be governed by the ease of manufacture, the dimensions of the fixing surface, and/or the dimensions of the portion(s) of the fastener with which the restraining element engages with during use.

For example, the diameter of the restraining element may be set to substantially span the width of the fixing surface and/or not exceed the width of the fixing surface. As a further example, the diameter of the restraining element may additionally or alternatively be set to substantially span the width of a bearing surface of the fastener and/or not exceed the width of the bearing surface of the fastener.

The diameter of the at least one restraining element—e.g. the diameter of a protrusion or depression having a spherical, hemispherical, ellipsoidal, cylindrical, cuboid, polygonal, or multi-lobular shape—may be between 1.50 millimetres (mm) and 4.00 millimetres (mm). In particular, the diameter of the restraining element may be between 1.50 mm to 1.75 mm, 1.75 mm to 2.00 mm, 2.00 mm to 2.25 mm, 2.25 mm to 2.50 mm, 2.50 mm to 2.75 mm, 2.75 mm to 3.00 mm, 3.00 mm to 3.25 mm, 3.25 mm to 3.50 mm, 3.50 mm to 3.75 mm, 3.75 mm to 4.00 mm, or 1.50 mm to 3.75 mm. Additionally, the height/depth of the restraining element may be between 0.50 mm to 1.00 mm. In particular, the height/depth of the restraining element may be between 0.50 mm to 0.75 mm, or 0.75 mm to 1.00 mm. Preferably the height/depth of the restraining element is about 0.75 mm.

In a preferred set of examples, the restraining element is a protrusion or depression having a hemispherical shape. Preferably, to provide maximum resistance against the rotational movement of the fastener, the hemispherical protrusion or hemispherical depression may have a diameter of about 3.50 mm and a height/depth of about 0.75 mm.

In some examples, the at least one restraining element is arranged with its centre at a distance of between 6.00 mm to 6.50 mm from the centre of the fixing surface. In particular, the at least one restraining element is arranged with its centre at a distance of between 6.00 mm to 6.25 mm or 6.25 mm to 6.50 mm from the centre of the fixing surface. Preferably, the at least one restraining element is arranged with its centre at a distance of 6.375 mm+/−0.020 mm from the centre of the fixing surface.

Preferably, the torque disc is a composite material torque disc comprising a polymer matrix embedded with a reinforcing fibre (also referred to herein as a core structural fibre). The use of such composite materials is advantageous in that the materials are of high strength whilst also being relatively low in weight. As an example, the composite material torque disc comprising a polymer matrix embedded with a reinforcing fibre may be a carbon fibre reinforced polymer (CFRP) comprising a thermoset or thermoplastic matrix system, such as a PolyEtherEtherKetone (PEEK) system or other epoxy resin system. As a further example, the composite material torque disc comprising a polymer matrix embedded with a reinforcing fibre may be a glass fibre reinforced plastic (GFRP) comprising a fibre reinforcement system, such as a carbon fibre reinforcement system, a glass fibre reinforcement system, or a hybrid carbon fibre and glass fibre reinforcement system which, for example, is described further below. As a further example, the composite material torque disc may comprise aramid fibre reinforcement.

A known issue with such composite materials is that the formation of an opening in the composite material can weaken the material. Further, too high a bending force may cause small stress fractures that can weaken the torque disc.

To address the above issues, in some arrangements the reinforcing fibre (i.e. core structural fibre) is arranged to form a hub of increased thickness in the torque disc, wherein the hub defines the fixing surface. For example, as described in WO2013/064807, the reinforcing fibre may repeatedly pass around each fixing surface to form a hub of increased thickness in the torque disc. In some examples, each hub is conveniently of generally oval shape with the major axis thereof extending generally radially of the torque disc.

The arrangement of the reinforcing fibres to form a hub enhances the strength of the fixing surface and thereby enables greater loadings to be applied to the fixing surface by, for example, the fastener.

Optionally, the composite material torque disc is conveniently formed with a plurality of fixing surfaces, and the reinforcing fibre is arranged to repeatedly encircle adjacent pairs of fixing surfaces such that the reinforcing fibre strengthens each fixing surface. Conveniently, the reinforcing fibre further serves to assist in transmission of loadings between adjacent fixing surfaces. In this way, the arrangement of the fibre improves the torque transmission characteristics (i.e. rigidity) in the rotation direction (i.e. circumferentially) while having a degree of compliance under bending moments (i.e. out of plane loads).

Optionally, the reinforcing fibre may be arranged to encircle each adjacent pair of fixing surfaces at least ten times. Preferably, the torque disc further comprises a generally planar region interconnecting an adjacent pair of fixing surfaces. Preferably, the torque disc includes a support layer upon which the reinforcing fibre is secured.

In some examples, the fixing surface (e.g. the hub) is moulded to define the at least one restraining element. Moulding the hub to define the at least one restraining element results in minimal disruption to the reinforcing fibre arrangement. Accordingly, the inventors have found the at least one restraining element can be moulded as a feature of the hub to provide easier attachment and detachment of the fastener to or from the torque disc without losing the above strength enhancement associated with the arrangement of the reinforcing fibres.

Further, whilst moulding applies a bending force to the composite material, and bending forces are known to cause small stress fractures that can weaken the torque disc, the inventors have found that moulding in fact causes minimal disruption to the structural properties of the fibre architecture.

In particular, the inventors have found that a protrusion or a depression having a hemispherical or ellipsoidal shape is particularly beneficial in that they cause the least amount of disruption to the reinforcing fibre arrangement, as compared to a protrusion or depression having an angular edge (e.g. a cuboidal protrusion).

Further, the inventors have also found that a protrusion or a depression having a hemispherical or ellipsoidal shape results in a more even distribution of stress within the protrusion/depression during assembly, as compared to a protrusion or depression having an angular edge. Accordingly, a hub moulded to define the at least one restraining element results in fewer stress fractures which, for example, could otherwise result in an engineer not being able to correctly install a drive shaft system.

In some examples, the fixing surface defines an opening, arranged adjacent to the at least one restraining element, for the passage of a component of the fastener in use through the torque disc, towards the fixing surface or away from the fixing surface. For example, an opening may be formed at each fixing surface to allow a bolt component or other component of a fastener to extend through the opening and attach with a nut component or other component of the fastener that is arranged at the fixing surface.

In some examples, a hub formed by reinforcing fibre (i.e. core structural fibre) as described above may surround the opening to provide the fixture surface.

Preferably, the width of the hub is at least the same width as the restraining element such that the diameter of the restraining element substantially spans the width of the hub (i.e. fixing surface), but does not exceed the width of the hub. For example, in accordance with the above examples of the restraining element's diameter, the width of the hub may at least be between 1.50 millimetres (mm) and 4.00 millimetres (mm). In particular, the width of the hub may at least be between 1.50 mm to 1.75 mm, 1.75 mm to 2.00 mm, 2.00 mm to 2.25 mm, 2.25 mm to 2.50 mm, 2.50 mm to 2.75 mm, 2.75 mm to 3.00 mm, 3.00 mm to 3.25 mm, 3.25 mm to 3.50 mm, 3.50 mm to 3.75 mm, 3.75 mm to 4.00 mm, or 1.50 mm to 3.75 mm. Preferably the width of the hub is at least 3.50 mm. In an example, the width of a hub comprising at least one hemispherical restraining element is 3.50 mm, wherein the diameter of the hemispherical restraining element is also 3.50 mm.

According to a second aspect of the present disclosure there is provided a torque disc assembly comprising: a torque disc according to any of the above examples; and a fastener comprising at least one second restraining element arranged to engage with the at least one restraining element extending from the fixing surface so as to restrain rotational movement of the fastener during attachment or detachment of the fastener to or from the torque disc.

The two restraining elements make it easier to attach and detach a fastener to the torque disc by engaging with (e.g. gripping) onto each other at the fixing surface so as to restrain the rotational movement of the fastener. Advantageously, this restraining force is provided by the interaction of the two restraining elements rather than an engineer holding the fastener. Accordingly, when attaching the fastener to the torque disc by, for example, screwing a bolt into a nut to form the fastener, an engineer does not need to simultaneously hold the nut to restrain the rotational movement of the nut. This is particularly beneficial when installing or removing the torque disc in, for example, airplane wings where space is limited.

The at least one second restraining element may have a substantially spherical, hemispherical, ellipsoidal, cylindrical, cuboid, polygonal, or multi-lobular shape. Preferably, the second restraining element is selected to fit together with the shape of the first restraining element.

In the examples described herein, the fastener may comprise one or more of: a nut component for engaging with a bolt component; a bolt component for engaging with a nut component; and an insert component for engaging with a nut component and/or a bolt component, such as the insert described below. That is, the fastener may be a nut, a bolt, a nut plus bolt, an insert plus nut, an insert plus bolt, or an insert plus nut plus bolt.

For example, the fastener may comprise a threaded bolt and/or a nut defining a threaded hole to screw-fit onto the threaded bolt. Preferably, the fastener is made of a metal.

The nut may comprise a bearing surface for contacting the fixing surface of the torque disc and the at least one second restraining element may extend from the bearing surface of the nut.

Optionally, as mentioned above, the fastener may also comprise an insert. The insert may be made of metal such as titanium. Further the insert may project from both axial ends of an opening defined in the fixing surface. A first end part of the insert may be fitted within the opening. A second end part, opposite to the first, may comprise an opening to house the nut. The insert may also comprise a flange and the surface of the flange facing the first end part, or the fixing surface, may define a bearing surface for contacting the fixing surface of the torque disc. Therefore, the fastener may also comprise an insert comprising an opening to house the nut and a bearing surface for contacting the fixing surface of the torque disc. The at least one second restraining element may extend from the bearing surface of the insert.

The insert is preferably interference fitted within an opening defined in the fixing surface.

In some examples, the at least one second restraining element is a protrusion extending from (i.e. out of) the bearing surface of the nut and/or insert. In particular, the protrusion may be shaped to fit at least partially inside the at least one restraining element of the torque disc. This engagement between the two restraining elements obstructs rotational movement of the nut and/or insert during attachment to or detachment from the torque disc. The at least one restraining element of the torque disc may be a depression or opening as set out above. In a preferred example, the protrusion of the insert and/or nut is shaped to interference fit inside the depression or opening of the torque disc.

In some examples, the at least one second restraining element is a depression extending from (i.e. into) the bearing surface of the insert and/or nut. The depression may be shaped to at least partially house the at least one restraining element of the torque disc. This engagement between the two restraining elements obstructs rotational movement of the fastener during attachment to or detachment from the torque disc. The at least one restraining element of the torque disc may be a protrusion as set out above. In a preferred example, the depression on the bearing surface of the insert and/or nut is shaped to interference fit with the protrusion of the torque disc. Further, the depression on the bearing surface of the insert and/or nut may be shaped to wrap around a protrusion extending out of the fixing surface of the torque disc.

Optionally, a bearing surface of the fastener (e.g. the bearing surface of the nut or insert) may be treated so as to provide an additional mode of attachment to the fixing surface of the torque disc. As an example, the bearing surface may be coated with an adhesive layer to adhesively bond to the fixing surface. Additionally, or alternatively, the bearing surface may be treated to define a serrated or knurled surface to slightly compress the fixing surface during assembly of the fastener to the torque disc.

BRIEF DESCRIPTION OF DRAWINGS

One or more non-limiting examples will now be described, with reference to the accompanying drawings, in which:

Referring to FIGS. 1 to 6 of the accompanying drawings, a composite material torque disc 10 comprising a polymer matrix embedded with a reinforcing fibre is illustrated. The torque disc 10 includes a generally planar part 12 of generally hexagonal shape and substantially uniform thickness. Of course the torque disc 10 may have any suitable annular shape with a generally circular and/or polygonal periphery. Integrally formed on the planar part 12 of the torque disc 10 are a series of hubs 14 of increased thickness. The width of each hub 14 is 3.55 mm. Each hub 14 defines a fixing surface in accordance with the examples of the present disclosure. Extending from the fixing surface of each hub 14 is a pair of restraining elements 50, as shown in FIG. 1, which may be in the form of a depression extending into the fixing surface or a protrusion extending out of the fixing surface, however in the subsequent description the restraining elements 50 will be discussed as protrusions. Extending from the surface of each hub 14 is a pair of restraining elements in the form of hemispherical protrusions 50. The diameter of each hemispherical protrusion 50 is 3.50 mm and substantially spans the width of its respective fixing surface 14. The height of each hemispherical protrusion 50 is 0.75 mm. The formation of the hubs 14 and the restraining elements 50 is described below.

Figure 1:
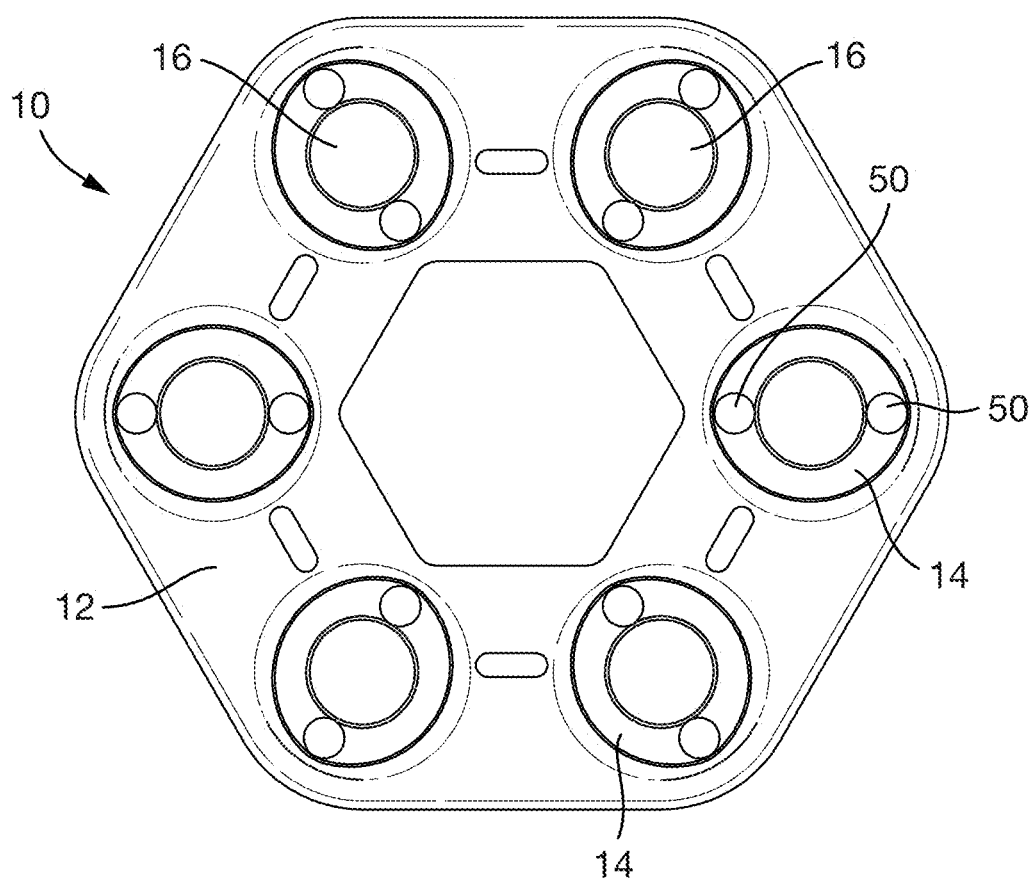
FIG. 1 is a perspective view illustrating a torque disc in accordance with an example of the present disclosure.

Openings 16 extend axially through the torque disc 10 at each hub 14. The openings 16 define fixing points whereby the torque disc 10 can be secured to, for example, a flange 18 of an adjacent rotating shaft 100, 100' or other component using a fastener 700, 700' as seen in FIGS. 5 and 6.

Figure 4:
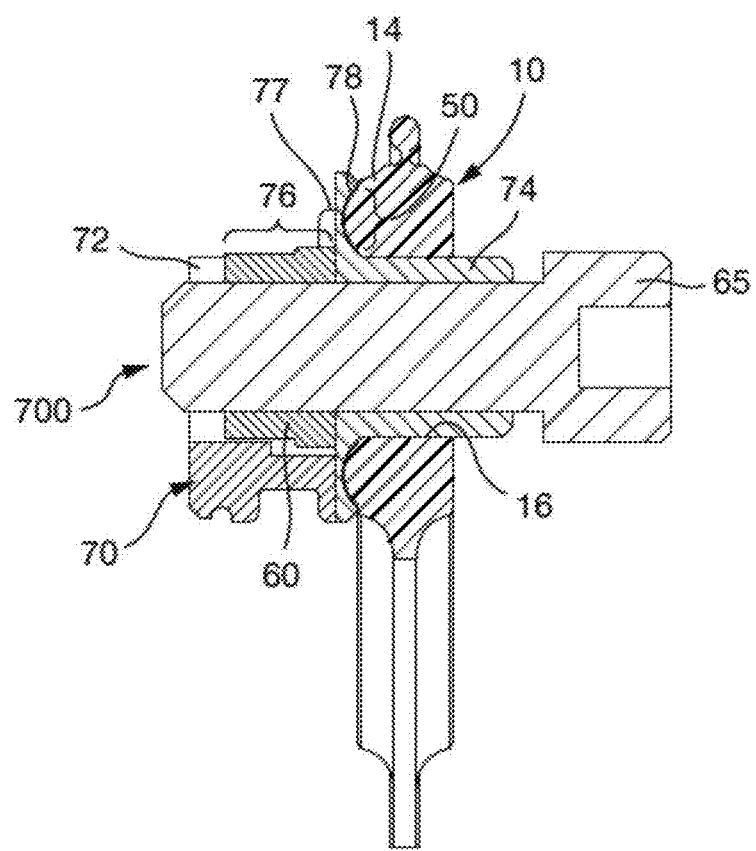
FIG. 4 shows a cross section of the torque disc of FIG. 1 assembled to a fastener.
Figure 5:
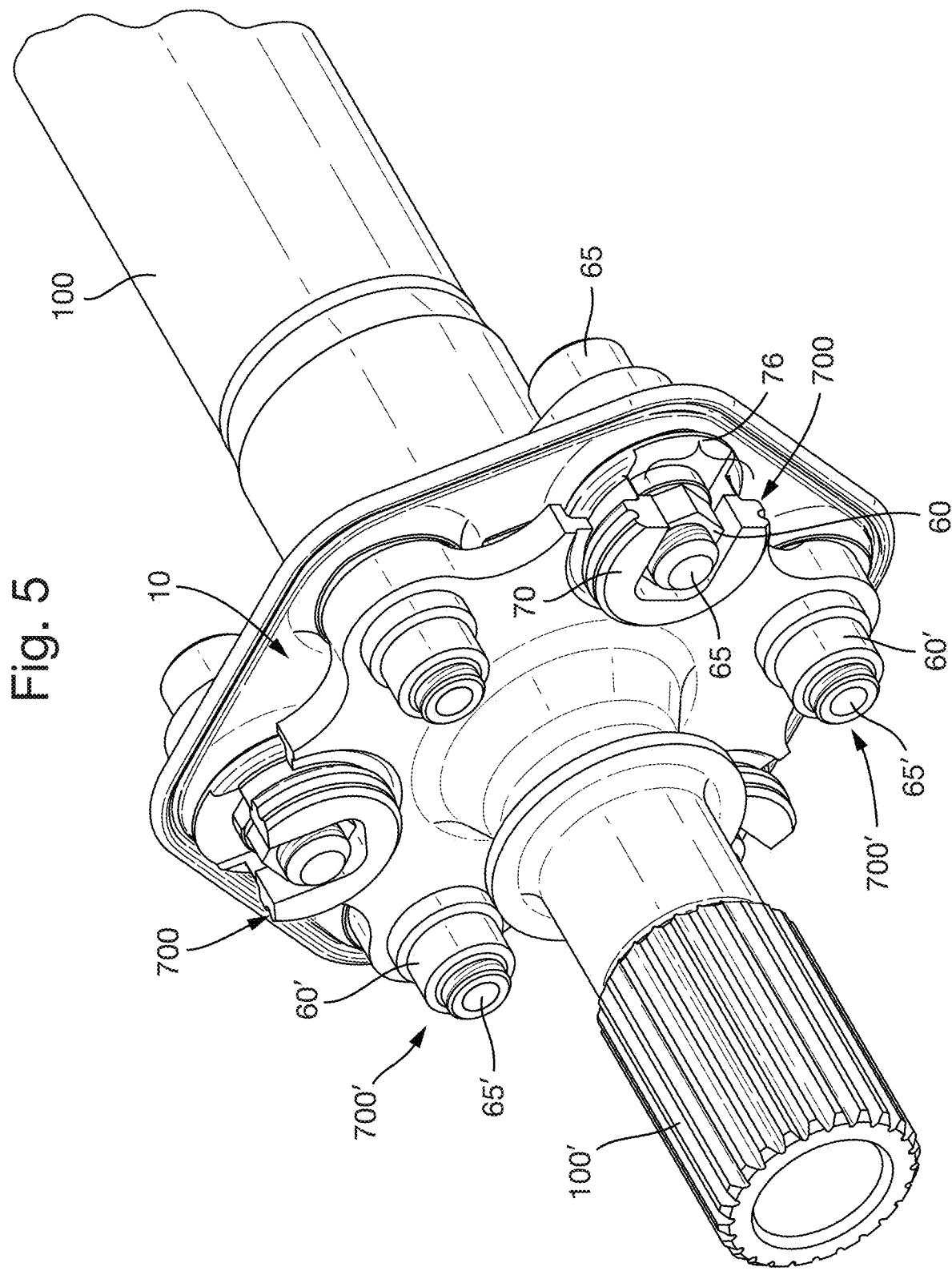
FIG. 5 shows the torque disc of FIG. 1 assembled to two shafts by fasteners.
Figure 6:
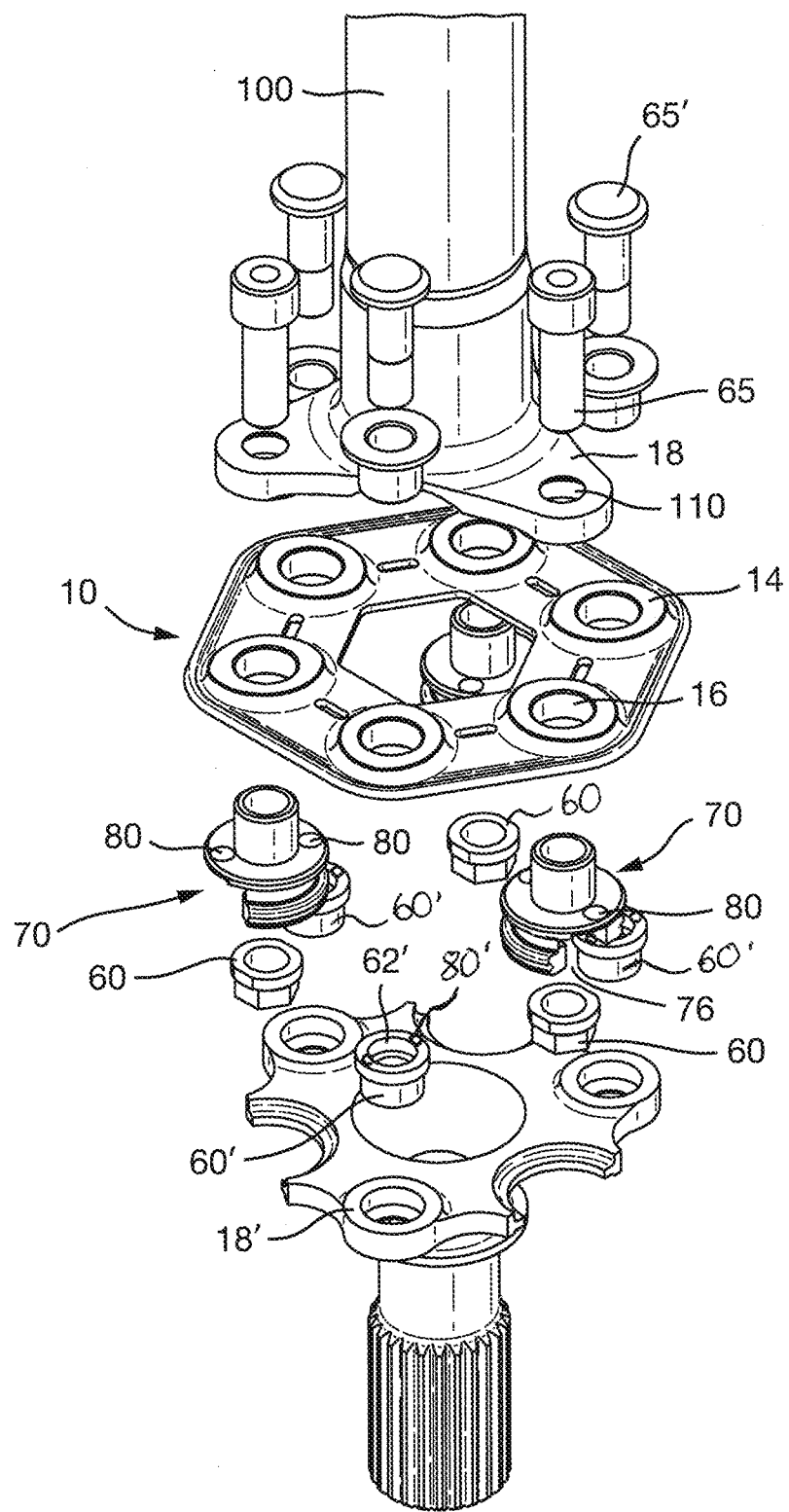
FIG. 6 shows an exploded view of FIG. 5.

As shown in FIGS. 4 to 6, a first adjacent rotating shaft 100 is connected to the torque disc 10 via first fasteners 700 comprising an insert 70, a bolt 65, and a nut 60, and a second adjacent rotating shaft 100' is connected to the torque disc 10 via second fasteners 700' comprising a bolt 65' and a nut 60'.

Preferably, the first fasteners 700 are connected to every other hub 14 for connecting the first adjacent rotating shaft 100 and the second fasteners 700' are connected to the remaining hubs 14 for connecting the second adjacent rotating shaft 100'.

As seen in FIG. 4, the insert 70 of the first fastener 700 has a generally cylindrical head part 72 and a cylindrical shaft 74 extending therefrom. The head part 72 of the insert 70 has an opening 76 open to one side so as to permit insertion and removal of the nut 60 of the first fastener 700. Preferably the opening 76 is shaped to hold the nut 60 of the first fastener 700 captive such that it cannot rotate relative to the insert 70 when the first fastener 700 is attached to or detached from the torque disc 10 and the adjacent first rotating shaft 100.

The cylindrical shaft 74 of the insert 70 is fitted within the opening 16 of the torque disc 10, optionally using an interference fit that may slightly compress the material of the torque disc 10 adjacent the respective opening 16. The cylindrical shaft 74 is hollow, having a central bore through which the bolt 65 of the first fastener 700 is inserted and screwed into/out of connection with the nut 60 during attachment/detachment of the first fastener 700, as per the examples of the present disclosure.

As can be seen in FIG. 5, when mounted to the torque disc 10, each insert 70 is arranged with its opening 76 facing radially outwards, i.e. towards the perimeter of torque disc 10 so as to provide best access to the nut 60 of the first fastener 700 for installation, maintenance and repair.

As best seen in FIG. 4, the insert 70 also has a flange 77 arranged at the base of the cylindrical head part 72 and extending outwardly therefrom. The flange 77 comprises a bearing surface 78 facing the hub 14 and the cylindrical shaft 74. The width of the bearing surface is 3.55 mm, meaning that in this example, the diameter of each hemispherical protrusion 50 will also substantially span the width of the bearing surface of the insert 70.

The bearing surface 78 of the insert 70 is shaped to define a pair of hemispherical depressions 80. The hemispherical depressions 80 are positioned on the bearing surface 78 such that they engage with the hemispherical protrusions 50 of the hub 14 to which the insert 70 is connected. Each hemispherical depression 80 is shaped such that the corresponding hemispherical protrusion 50 on the hub 14 interference fits inside the hemispherical depressions 80 of the insert 70. Accordingly, it will be appreciated that each hemispherical depression may have a diameter that is approximately the same as the diameter of the hemispherical protrusions 50. In this way, the hemispherical protrusions 50 on a hub 14 engage with the hemispherical depressions 80 on the bearing surface 78 of the insert 70 so as to restrain rotational movement of the insert 70 during attachment/detachment of the first fastener 700. Beneficially, therefore, an engineer does not need to restrain the rotation of the insert 70 at the hub 14 when attaching or detaching the first fastener 700 to/from the torque disc 10.

The nut 60' of the second fastener 700' comprises a bearing surface 62' that in use faces the hub 14 and/or the bolt 65' of the second fastener 700'.

Optionally, the bearing surface 62' of the nut 60' may also be shaped to define a pair of hemispherical depressions 80' (not shown in FIG. 6). The hemispherical depressions are positioned on the bearing surface 62' such that they engage with the hemispherical protrusions 50 of the hub 14 to which the nut 60' of the second fastener 700' is connected. Each hemispherical depression 80' of the nut 60' may be shaped such that the corresponding hemispherical protrusion 50 on the hub 14 interference fits inside the hemispherical depressions 80' of the nut 60'. Accordingly, it will be appreciated that each hemispherical depression may have a diameter that is approximately the same as the diameter of the hemispherical protrusions 50. In this way, the hemispherical protrusions 50 on a hub 14 engage with the hemispherical depressions 80' on the bearing surface 62' of the nut 60' of the second fastener 700' so as to restrain rotational movement of the nut 60 during attachment/detachment of the second fastener

700'. Beneficially, therefore, an engineer does not need to restrain the rotation of the nut 60' at the hub 14 when screw fitting it with a bolt 65' of the second fastener during attachment or detachment of the second fastener 700' to/from the torque disc 10.

In use, alternate ones of the openings 16 are used to secure the torque disc 10 to the first shaft 100 using the first fasteners 700. Specifically, the torque disc 10 is secured to the flange 18 of the first rotating shaft 100 by inserting the bolt 65 of the first fastener 700 through the cylindrical shaft 74 of an insert 70 extending through an opening 16 of the torque disc 10, and screwing it onto a nut 60 housed within the insert 70.

During attachment or detachment of the first fastener 700, the hemispherical protrusions 50 associated with the hubs 14 surrounding the alternate openings 16 engage with the hemispherical depressions 80 of the insert 70 so as to restrain rotational movement of the insert 70. Beneficially, therefore, an engineer does not need to restrain the rotation of the insert 70 when attaching/detaching the first fastener 700.

The remaining alternate ones of the openings 16 are used to secure the torque disc 10 to the second shaft 100' using the second fasteners 700', as illustrated in FIGS. 5 and 6. Specifically, the second fasteners 700' are attached by inserting the bolt 65' of the second fastener 700' through an opening 16 in the torque disc and a corresponding opening 110 formed in the flange 18' of the second shaft 100', and securely screwing the bolt 65' of the second fastener 700' on to the nut 60' of the second fastener 700'. It will be appreciated that the attachment of the torque disc 10 to the second shaft 700' does not use an insert 70.

During attachment or detachment of the second fastener 700', the hemispherical protrusions 50 associated with the hubs 14 surrounding the alternate openings 16 engage with the bearing surface 62' of the nut 60' so as to restrain rotational movement of the nut 60'. Optionally, if the bearing surface 62' of the nut 60' also comprises hemispherical depressions, the hemispherical protrusions 50 of the hub 14 may engage with the hemispherical depressions to resist rotational movement of the nut 60 during attachment/detachment of the second fastener 700', as per the examples described herein. Beneficially, therefore, an engineer also does not need to restrain the rotation of the nut 60' at the hub 14 when attaching/detaching the second fastener 700' to the torque disc 10.

Rotation of, and torque loadings applied to, one of the shafts 100, 100' are transmitted by the torque disc 10 to the other of the shafts 100, 100', flexing of the planar part 12 of the torque disc 10 accommodating slight misalignments between the shafts 100, 100'. Such a composite material torque disc 10 may therefore be referred to as a flexible coupling.

Figure 2:
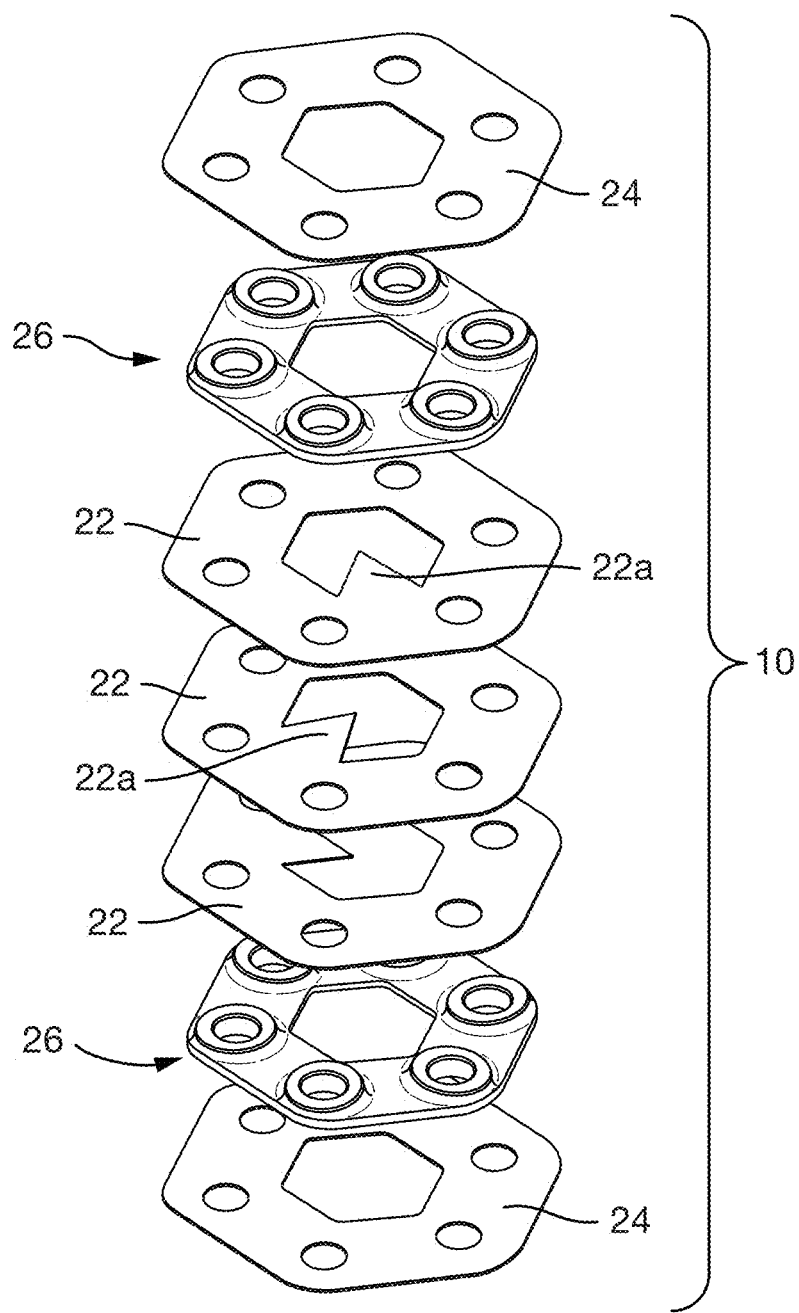
FIG. 2 is a diagrammatic exploded view of the torque disc of FIG. 1.

As shown in FIG. 2, the torque disc 10 is of multi-layered form, being made up of a plurality of support layers 22 (also referred to herein as a woven material) of woven, fibrous form. In this example, the support layers 22 are sandwiched between a pair of outer support layers 24. Each support layer 22 is conveniently of woven carbon fibre form, and the individual support layers 22 are conveniently orientated such that the weave of each layer is angularly displaced relative to that of an adjacent one of the layers 22. An indicator part 22*a* is conveniently provided on each layer 22 to assist in the manufacturing process, providing a visible indication of the orientation of each support layer 22, the parts 22*a* being removed in the finished product.

Each outer support layer 24 takes the form of a veil of glass fibre, carbon fibre or aramid fibre form. It will be appreciated that other fibrous materials may be used to form the veil for the outer support layer 24 depending upon the required operating characteristics and conditions of use. During the manufacturing process, the veil may act as a carrier and manufacturing aid for the formation of the fibre architecture.

To the surface of each outer support layer 24 facing towards the support layers 22 is secured a core structural fibre 26 (which may also be referred to herein as a reinforcing fibre 26, or a stitched preform 26). In FIG. 2, the core structural fibres 26 are illustrated as a separate layer. It will be appreciated, however, that in practice the core structural fibre 26 is secured to the associated outer support layer 24 prior to assembly or laying up of the layers forming the torque disc 10. The core structural fibre 26 is preferably secured to the outer support layer 24 by stitching the core structural fibre 26 to the outer support layer 24 using, for example, a polyester thread. The core structural fibre 26 takes the form of a carbon fibre tow, made up, in the preferred example, of approximately 6000 individual filaments.

The assembly of the support layers 22 and outer support layers 24, each outer support layer 24 having a core structural fibre 26 secured thereto, is compressed and embedded within, and impregnated by, a polymer matrix material in a compression or pressure moulding process. During the moulding process, a moulding tool is used to mould one or both of the outer support layers 24 to define the restraining elements 50.

Figure 3A:
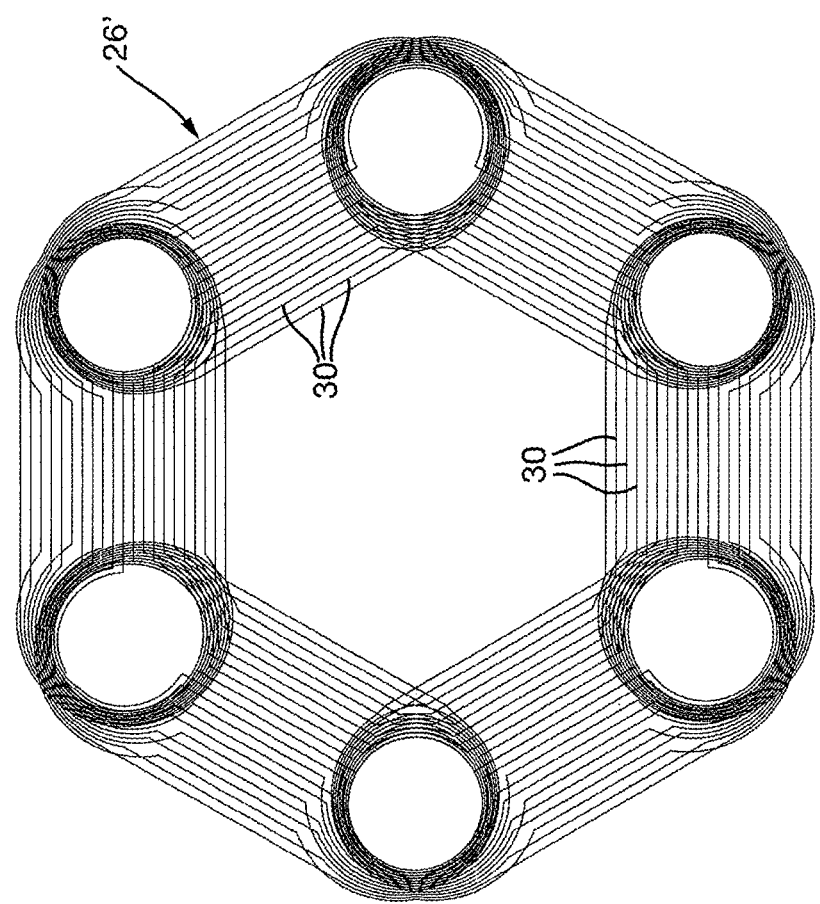
FIGS. 3A and 3B are diagrams illustrating the pattern in which the reinforcing fibre is secured to the support layer of FIG. 2.
Figure 3B:
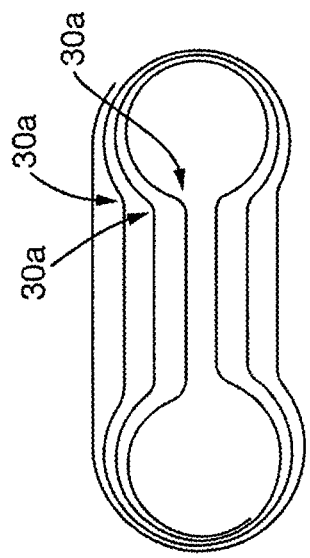

FIGS. 3A and 3B illustrate the pattern in which the core structural fibre 26' is secured to the outer support layer 24. As shown, the fibre 26' repeatedly encircles each adjacent pair of fixing points and so forms a series of windings 30. In the arrangement illustrated, ten windings 30 encircle each adjacent pair of fixing points. It will be appreciated, however, that more or fewer windings 30 could be provided, if desired. Between the locations of the fixing points, the windings 30 are generally uniformly spread apart from one another. Such spreading of the windings 30 avoids unnecessarily overlying one winding over another and so avoids unnecessarily increasing the thickness of the planar part 12 of the torque disc 10. This allows the planar part 12 to be thinner than in similar torque discs produced by the traditional method whilst having the same (or greater) torque transmitting capability. Further, the reduced thickness of the planer part 12 allows the disc 10 to have greater flexibility in this region resulting in lower stresses, in use, for a given misalignment of shafts and an ability to more readily accommodate greater shaft misalignments. In order to maximise the number of windings 30 without overlying the windings 30 or increasing the overall dimensions of the torque disc 10, the inner ones of the windings 30 are shaped so as to almost completely encircle one of the fixing points before extending directly towards and almost completely encircling the adjacent one of the fixing points, as shown diagrammatically in FIG. 3A. Such a pattern does result in the formation of parts 30*a* where the radius of curvature of the core structural fibre 26' is relatively small, but it is still sufficiently large as to avoid an unacceptably high risk of snapping or failure of the core structural fibre 26'.

As the core structural fibre 26' passes around each fixing point the spacing of the windings 30 is reduced with the result that some of the windings 30 may lie on top of others of the windings 30 in this region. This stacking of the windings 30 upon one another serves to strengthen the hubs 14. Also, it results in the hubs 14 taking on a generally oval shape with the major axes thereof extending generally radially of the torque disc 10. The oval shaping of the hubs 14 maximises the separation of the hubs 14 and so maximises the flexibility of the torque disc 10.

A single core structural fibre 26' is secured to each outer supporting layer 24, the core structural fibre 26', after being wound around one pair of adjacent fixing points by the required number of windings, then being wound around the next adjacent pair of fixing points, this process being repeated until the pattern shown in FIG. 3A is achieved.

Whilst one specific core structural fibre pattern is described hereinbefore and shown in the drawings, it will be appreciated that a range of other patterns could be used without departing from the scope of the present disclosure. Furthermore, whilst the described pattern is achieved using a single length of core structural fibre 26', several such fibres could be secured to the outer support layers 24, if desired.

The torque disc 10 of this example is advantageous in that it is of relatively low weight, but of high strength, the presence of the core structural fibres 26 serving to bear torsional loadings, transmitting the loadings between the adjacent fixing points and hence between the shafts, without requiring the torque disc to be of great thickness, and so maintaining sufficient flexibility to be able to accommodate the required level of misalignment between the shafts. The manner in which the core structural fibre 26' passes around the fixing points serves to enhance the strength thereof. As the pattern of the core structural fibre 26' is repeated for each adjacent pair of fixing points, the adjacent groups of windings can interlock with one another, further enhancing the performance of the device. A torque disc 10 produced in the manner of this example also exhibits a greater fatigue resistance than similar torque discs manufactured in a traditional manner in that the support layer with stitched carbon fibre reinforcement is much less susceptible in use to fatigue fractures within the individual filaments and any such fractures which do occur have far less impact on the overall continued torque transmitting capability of the disc.

Whilst specific examples of the present disclosure are described hereinbefore, it will be appreciated that a wide range of modifications and alterations may be made thereto without departing from the scope of the present disclosure.

The invention claimed is:

1. A torque disc comprising:
    a fixing surface, the fixing surface defining an area of the torque disc for attachment to a fastener in use; and
    at least one restraining element, with a substantially spherical or hemispherical shape, extending from the fixing surface so as to engage in use with at least one portion of the fastener to restrain rotational movement of the fastener during attachment to or detachment from the torque disc,
    wherein the torque disc is a composite material torque disc comprising a polymer matrix embedded with a core structural fiber, wherein the core structural fiber repeatedly encircles the fixing surface to form a hub of increased thickness in the torque disc.

2. A torque disc according to claim 1, wherein the fixing surface is shaped to define the at least one restraining element.

3. A torque disc according to claim 1, wherein the at least one restraining element is a protrusion extending out of the fixing surface.

4. A torque disc according to claim 3, wherein the protrusion is shaped to interference fit inside the at least one portion of the fastener.

5. A torque disc according to claim 1, wherein the at least one restraining element is a depression extending into the fixing surface.

6. A torque disc according to claim 1, wherein the fixing surface defines an opening, arranged adjacent to the at least one restraining element, for the passage of a portion of the fastener in use through the torque disc, towards the fixing surface or away from the fixing surface.

7. A torque disc according to claim 1, wherein the hub surrounds the opening.

8. A torque disc assembly comprising:
    a torque disc according to claim 1; and
    a fastener comprising at least one second restraining element arranged to engage with the at least one restraining element extending from the fixing surface so as to restrain rotational movement of the fastener during attachment or detachment of the fastener to or from the torque disc.

9. A torque disc assembly according to claim 8, wherein the fastener comprises a threaded bolt and a nut, the nut defining a threaded hole to screw-fit onto the threaded bolt.

10. A torque disc assembly according to claim 9, wherein the nut comprises a bearing surface contacting the fixing surface of the torque disc and wherein the at least one second restraining element extends from the bearing surface of the nut.

11. A torque disc assembly according to claim 9, wherein the fastener comprises an insert, the insert comprising an opening to house the nut and a bearing surface contacting the fixing surface of the torque disc, wherein the at least one second restraining element extends from the bearing surface of the insert.

* * * * *